(12) United States Patent
Leyrer et al.

(10) Patent No.: US 7,113,533 B2
(45) Date of Patent: Sep. 26, 2006

(54) AMPLIFYING MEDIUM FOR SOLID-STATE DYE LASERS

(75) Inventors: Reinhold J. Leyrer, Dannstadt (DE); Christoph Hamers, Ludwigshafen (DE); Holger Schoepke, Neckargemuend (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 134 days.

(21) Appl. No.: 10/495,126

(22) PCT Filed: Nov. 20, 2002

(86) PCT No.: PCT/EP02/13027

§ 371 (c)(1),
(2), (4) Date: May 20, 2004

(87) PCT Pub. No.: WO03/044911

PCT Pub. Date: May 30, 2003

(65) Prior Publication Data

US 2005/0008057 A1   Jan. 13, 2005

(30) Foreign Application Priority Data

Nov. 20, 2001   (DE) ................. 101 56 842

(51) Int. Cl.
H01S 3/14 (2006.01)
H01S 3/20 (2006.01)
H01S 3/08 (2006.01)

(52) U.S. Cl. .............................. 372/53; 372/39; 372/92

(58) Field of Classification Search ................... 372/53
See application file for complete search history.

(56) References Cited

U.S. PATENT DOCUMENTS 3,771,065 A   11/1973   Goldberg et al.
5,625,456 A * 4/1997   Lawandy ..................... 356/601
6,141,367 A   10/2000  Fan et al.

FOREIGN PATENT DOCUMENTS

| EP | 955 323 | 11/1999 |
|----|---------|---------|
| WO | 01/18283 | 3/2001 |
| WO | WO 01/62830 * | 3/2001 |
| WO | 01/62830 | 8/2001 |

OTHER PUBLICATIONS

Sergey V. Frolov, "Laser-like emission in opal photonic crystals", Optics Communications, vol. 162, pp. 241-246 Apr. 15, 1999.
Eugenia Kumacheva, et al., "Three-dimensional arrays in polymer nanocomposites", Advanced Materials, vol. 11, No. 3, pp. 231-234 Feb. 11, 1999.
Tsuneo Okubo, Prog. Polym. Sci., vol. 18, pp. 481-517.
Werner Luck, et al., Festschrift Carl Wurstler, BASF 1960, C.A.: 55:14009d.

* cited by examiner

Primary Examiner—Armando Rodriguez
(74) Attorney, Agent, or Firm—Oblon, Spivak, McClelland, Maier & Neustadt, P.C.

(57) ABSTRACT

The present invention relates to an amplifying medium for solid-state dye lasers and to a solid-state dye laser provided with an amplifying medium of this type. The amplifying medium according to the invention comprises an essentially solid active medium which contains at least one type of activatable particle which can be excited to emit laser light in a certain wavelength range, and optical feedback means which define a resonator for the laser light, where the feedback means comprise an essentially solid feedback medium which has a periodic structure. The feedback medium in the amplifying medium is a polymeric dispersion film having a crystalline structure which comprises, in particular, core/shell particles which can be formed into a film.

10 Claims, 2 Drawing Sheets

AMPLIFYING MEDIUM FOR SOLID-STATE DYE LASERS

The present invention relates to solid-state dye lasers and in particular to an amplifying medium for solid-state dye lasers which is based on the principle of spatially distributed feedback.

Lasers (light amplification by stimulated emission of radiation) are radiation sources for coherent, quasi-monochromatic and sharply bundled radiation in the visible region and in the adjacent regions of the electromagnetic spectrum (far infrared, infrared, ultraviolet and X-rays). Lasers are employed in all areas of science and technology. The most important applications use laser light having a wavelength in the range from 300 to 1800 nm.

In principle, all lasers consist of three components: an active medium or laser medium (for example a gas, a solid, for example a crystal or diode, or a liquid), which substantially determines the optical properties of the laser; a pump source (for example a flash lamp, a pump laser or an electrically operated gas discharge), which-supplies energy- to the active medium, and finally a feedback medium or laser resonator, which provides the feedback and thus induced emission of the radiation. In the present application, the terms laser medium and active medium are used synonymously. The term "amplifying medium" here is taken to mean the system comprising active medium and feedback medium.

When light falls on excited particles, i.e. particles which have been promoted into higher-energy states, in the active medium, these particles can be stimulated to emit the excess energy as additional light with the same frequency, phase, polarization and direction as the incident light. Since the reverse process, i.e. the stimulated adsorption of light by non-excited particles of the active medium is likewise possible, overall amplification only occurs if more particles are in the excited state than in the non-excited state, i.e. if occupation inversion of the atomic energy level is generated and maintained. The amplifying medium must therefore contain particles, for example fluorescent dyes, which can be excited by the pump source and exhibit pronounced stimulated emission of electromagnetic radiation. In addition, an optical feedback mechanism is necessary so that a resonator is formed for the laser light emitted by the active particles. The simplest resonator consists of two opposed mirrors, with the amplifying medium arranged in between.

Lasers are usually classified according to the active medium used, for example as gas, dye, solid-state or semiconductor lasers.

Dye lasers are of particular interest in many areas of industry since lasers of this type are distinguished by a large continuous tuning range of the wavelength of the emitted laser radiation. In addition, high outputs can be achieved with narrow line widths.

The pumping mechanisms, i.e. the processes for exciting the activatable particles of the active medium, are very flexible.

The dye is usually excited by so-called optical pumping, with the energy source used being, for example, a flash lamp or a pump laser. Typical pump lasers are nitrogen, argon ion and frequency-doubled Nd:YAG (neodymium/yttrium aluminum garnet) lasers. Dye lasers are operated either continuously or in pulsed mode with pulse energies of up to 1 J and pulse durations in the femtosecond region.

Most dye lasers work with a liquid amplifying medium. However, solid-state dye lasers have also been developed, in which laser dyes are embedded in a solid matrix, for example a polymer matrix, such as polymethyl methacrylate (PMMA). Amplifying media in the form of solids avoid some of the disadvantages of liquid amplifying media, for example problems with handling or the health or environmental problems associated with many of the laser dyes and solvents usually used.

As an alternative to the use of mirrors to form the optical resonator for the laser light feedback, lasers have also been developed in which the optical feedback is distributed throughout the active medium, so that ultimately the active medium and the feedback medium can be a single medium. The term distributed feedback (DFB) is then used. DFB lasers can be implemented, for example, as semiconductor or dye lasers. They are frequently used if the aim is to implement single-mode operation or a tunable wavelength laser (Shank et al. "Tunable Distributed-Feedback Dye Laser", *Appl. Phys. Lett.*, 18 (1971), 152). The distributed feedback is facilitated by an amplifying medium whose optical properties, for example refractive index or amplification, are spatially modulated in the direction of the light propagation. A conventional method of achieving periodic modulation of this type in the amplifying medium comprises using a beam splitter to split a pump laser beam into two coherent pump beams, which are then superimposed again on the active medium at a certain angle. Interference between the individual beams causes spatial periodic modulation of the occupation density of the absorbing dye molecules, so that the laser amplification is modulated in a corresponding manner. The exit wavelength of the emitted laser light is then proportional to the periodicity of the interference pattern. The emission wavelength of the laser can therefore be tuned simply by changing the angle between the individual interfering beams of the pump laser.

U.S. Pat. No. 3,771,065 proposes a liquid amplifying medium for dye lasers which consists of a laser dye dissolved in a cholesteric liquid crystal. The cholesteric liquid crystal produces the distributed feedback here. Amplifying media of this type utilize characteristic optical properties of the cholesteric phase, also known as the chiral nematic phase, of certain liquid crystals: cholesteric liquid crystals develop a helical superstructure which-is characterized by a local nematic preferential direction (the so-called "director"), which is perpendicular to the helix axis. This nematic director varies along the helix axis with a helical periodicity, which is known as the "pitch". The pitch is determined by the concentration and helical twisting power of the chiral components. As a consequence of the helical periodicity of the cholesteric structure and the birefringence of the liquid crystal, light propagation along the helix axis is forbidden in a certain wavelength range for one of the normal modes. Consequently, incident light with a "forbidden" wavelength is strongly reflected. The edges of this reflection band are at wavelengths which correspond to the refractive indices multiplied by the helical pitch (cf. deGennes, "The Physics of Liquid Crystals", *Clarendon Press*, Oxford, 1974). If a cholesteric liquid crystal which is doped with a laser dye is arranged between two glass plates in the so-called planar structure, a Bragg phase grating is produced in the liquid-crystal layer. The laser emission then takes place perpendicularly to the film plane, and the laser wavelength is determined by the helical periodicity. By changing the temperature of the liquid-crystal matrix, it is possible to tune the pitch and thus the exit wavelength of the dye laser. However, liquid-crystal amplifying media are, as liquids, subjected to significant environmental influences, such as temperature variations, and are impracticable to handle in many applications.

U.S. Pat. No. 6,141,367, the disclosure content of which is expressly incorporated herein by way of reference, discloses a solid-state dye laser which has a solid active medium doped with laser dyes. The active medium proposed is, in particular, a polymeric cholesteric liquid crystal which is arranged in the planar structure and has been "frozen" at a characteristic wavelength. Through distributed feedback of the emitted laser light, the polymeric crystal simultaneously forms the resonator of the amplifying medium.

However, polymeric cholesteric liquid crystals are comparatively expensive and are complex systems to produce. A further disadvantage is that extreme care must be taken with alignment of the liquid crystals during the production process since this may be adversely affected by even extremely small amounts of impurities.

It is an object of the present invention to indicate a further amplifying medium, in particular one which is simpler and less expensive to produce, for solid-state dye lasers and to provide a corresponding dye laser.

We have found that this object is achieved by an amplifying medium as claimed in the present claim 1.

The present invention accordingly relates to an amplifying medium for solid-state dye lasers, comprising: an essentially solid active medium which comprises at least one type of particle which can be excited to emit laser light in a certain wavelength range, and optical feedback means which define a resonator for the laser light, where the feedback means comprise an essentially solid feedback medium which has a periodic structure, wherein the feedback medium is a polymeric dispersion film having a crystalline structure.

It is known that polymer particles in ordered structures are able to form films. Structures of this type, which are also known as colloidal crystals, can exhibit an angle-dependent color effect caused by Bragg scattering of incident light at the crystal planes. As soon as the separation between the center points of the particles is in the region of the wavelength of the incident electromagnetic radiation, the prerequisites for iridescent coloration are satisfied.

Surprisingly, it has now been found that colloidal crystals of this type can also be employed as feedback media for forming the resonator of a laser amplifying medium since the wavelength-dependent Bragg reflection at the grating structures causes dispersion films of this type to act as internal mirrors for light of a certain wavelength. The reflectors formed in this way are accordingly based on the principle of distributed feedback.

The amplifying media according to the invention can be produced inexpensively by simple measures.

For example, dispersion films, as described by T. Okubu, Prog.Polym.Sci. 18 (1993) 481–517; and W. Luck, H. Wesslau, *Festschrift Carl Wurstler*, BASF 1960, C.A.:55:14009d, can be employed in the amplifying medium according to the invention. Dispersions of this type in liquid form, if necessary after purification, tend toward pronounced latex crystallization.

However, particularly suitable polymer dispersions for the purposes of the present invention are organic core/shell particles whose core and shell materials are able to form a two-phase system. The shell material here can be formed into a film to give a matrix, while the core material, i.e. the cores of the core/shell particles, is essentially dimensionally stable under the conditions of film formation of the shell. The core can preferably only be swollen to a very slight extent, or not at all, by the shell material.

The feature applying to the cores, that they are essentially dimensionally stable, means that their shape and size do not change to such an extent during the course of the film formation that it becomes impossible to use the core/shell particles for the preparation of feedback media. In general, changes in their dimensions of up to +/−10% are permissible without severe disadvantages.

The feature "low swellability" of the cores by the shell material means that the mean diameter of the cores increases by at most 10% of the original value when they are embedded in the shell material. It is particularly advantageous for the cores to have the lowest possible swellability not only in the shell material itself, but also in solutions, dispersions or melts or in liquid precursors thereof.

The periodic structure of the dispersion film is preferably caused by differences between the refractive indices of the core material and of the matrix formed during film formation of the shell material. The difference $\Delta n$ in the refractive index of the core material and of the matrix is preferably at least 0.001 unit, in particular at least 0.01 unit, especially at least 0.1 unit. The core material may have the higher refractive index and the matrix the lower refractive index, or vice versa. The former case is preferred.

The core:shell weight ratio in the core/shell particles according to the invention is preferably from 1:3 to 20:1, preferably from 2:1 to 10:1, in particular from 2.5:1 to 5:1.

For use of the core/shell particles for the preparation of amplifying media for solid-state dye lasers, it is important that the shell material can be formed into a film, i.e. that, through simple measures, it can be softened, plasticized visco-elastically or liquefied to such an extent that the cores of the core/shell particles are able to form at least domains having a regular arrangement. The shell material formed into a film then, depending on its proportion in the core/shell particles, either forms a continuous phase which fills all cavities between the core particles, namely a matrix, or forms adhesive points only in the region of the points of contact of the core particles, fixing the latter in a regular arrangement. (The shell material can therefore also be referred to synonymously as matrix material or matrix phase.) The regularly arranged cores in the matrix formed by film formation of the shell of the core/shell particles form a diffraction grating, which causes interference phenomena and thereby results in distributed feedback of laser light of the corresponding wavelength.

The cores of the core/shell particles according to the invention have an essentially spherical, preferably ball-like shape. On liquefaction or softening of the shell material during film formation, they form the said macroscopic domains with a crystal-like structure. In many cases, the cores in this structure arrange themselves in the form of closest packing.

The cores of the core/shell particles according to the invention have a particle size of from 100 to 700 nm, preferably from 150 to 500 nm, in particular from 200 to 400 nm. They preferably have a monodisperse distribution, i.e. they exist in a narrow particle size distribution.

The particle size distribution is characterized by means of the polydispersity index P.I., which is defined by the following formula:

$$P.I.=(D_{90}-D_{10})/D_{50}$$

In this formula, $D_{90}$, $D_{50}$ and $D_{10}$ denote the particle diameters at which the integral of the distribution function $dG=f(D)*dD$, in which G is the polymer mass, D is the particle diameter, which achieves the values 0.9 (=90% by weight), 0.5 (=50% by weight) and 0.1 (=10% by weight) respectively of the total mass of the polymer substance. With narrowing particle size distribution, the value of P.I. approaches the value zero; the broader, i.e. the more polydisperse, the particle size distribution, the larger the P.I.

The particle size distribution can be determined in a manner known per se, for example with the aid of an analytical centrifuge (see, for example, W. Mächtle, *Makromol. Chem.* 185 (1984), pp. 1025–1039), and the P.I. value can be calculated from the resultant values. Alternatively, the particle sizes can also be determined using a commercial instrument which utilizes light scattering of the dispersions, for example the "Autosizer 2C" from MALVERN, England. Although the values obtained by the two methods for the polydispersity are not directly comparable, both are, however, suitable for characterization of the particle distribution of polymer dispersions. Core particles which are suitable for the present invention have P.I. values of less than 0.4, preferably less than 0.3, in particular less than 0.2.

So long as they satisfy the above-mentioned conditions, the materials of the core and shell may have an inorganic, organic or even metallic character or they may be hybrid materials.

However, with respect to the possibility of varying the invention-relevant properties of the cores of the core/shell particles according to the invention as required, it is advantageous for the cores to comprise one or more polymers and/or copolymers (core polymers) or to consist of such polymers.

The cores preferably comprise a single polymer or copolymer. For the same reason, it is advantageous that the shell of the core/shell particles according to the invention also comprises one or more polymers and/or copolymers (shell polymers; matrix polymers) or polymer precursors and, if desired, auxiliaries and additives, it being possible for the composition of the shell to be selected in such a way that it is essentially dimensionally stable and tack-free in a non-swelling environment at room temperature. So long as the shell material comprises auxiliaries and/or additives, its proportion of the shell weight is up to 40% by weight, preferably up to 20% by weight, in particular from 5 to 20% by weight. The core and shell of the particles according to the invention preferably consist of the above-mentioned constituents in the stated proportions. The sum of the percentages indicated for the individual components of a reference system (for example "core material" or "shell material") is of course 100% for each individual reference mixture. With the use of polymer substances as core and shell material, the person skilled in the art gains the freedom of their relevant properties, for example their composition, particle size, mechanical data, refractive index, glass transition temperature, melting point and core:shell weight ratio.

Polymers and/or copolymers which the core material comprises or of which it consists are high-molecular-weight compounds which conform to the specification indicated above for the core material. Both polymers and copolymers of polymerizable unsaturated monomers and polycondensates and copolycondensates of monomers containing at least two reactive groups, for example high-molecular-weight aliphatic, aliphatic/aromatic or fully aromatic polyesters, polyamides, polycarbonates, polyureas and polyurethanes, but also amino resins and phenolic resins, for example melamine-formaldehyde, urea-formaldehyde and phenol-formaldehyde condensates, are suitable.

The polymers of the core material are advantageously crosslinked (co)polymers since these best meet the requirement for low swellability. In addition, they favor the formation of core/shell structures during the production of the core/shell particles according to the invention. These crosslinked polymers may either have already been crosslinked during the polymerization or polycondensation or copolymerization or copolycondensation or they may have been post-crosslinked in a separate process step after the actual (co)polymerization or (co)polycondensation.

In order to provide the core/shell particles according to the invention with the broadest possible range of applications, it is advantageous for the shell material likewise to comprise or consist of one or more polymers and/or copolymers. In particular for economic reasons, it is advantageous for the shell material to comprise or consist of a polymer.

As for the core material, polymers of the above-mentioned classes are in principle also suitable for the shell material so long as they are selected or constructed in such a way that they meet the specification indicated above for the shell polymers. This means that they must have a refractive index which differs significantly from that of the core polymers, i.e. on use of high-refractive-index core polymers, low-refractive-index shell polymers must be employed, and vice versa. Furthermore, they should not tend to swell or dissolve the cores.

The polymer material of the matrix phase-forming shell of the core/shell particles according to the invention is advantageously an elastically deformable polymer, for example a polymer having a low glass transition temperature. In this case, it is possible to vary the emitted laser wavelength on stretching and compression of the dispersion film.

Polymers which meet the specifications for a matrix material are likewise from the groups consisting of the polymers and copolymers of polymerizable unsaturated monomers and the polycondensates and copolycondensates of monomers containing at least two reactive groups, for example high-molecular-weight aliphatic, aliphatic/aromatic or fully aromatic polyesters and polyamides, but also amino and phenolic resins, for example melamine-formaldehyde, urea-formaldehyde and phenol-formaldehyde condensates, which on drying condense further with considerable crosslinking. An analogous situation applies to epoxy resins consisting, for example, of mixtures of polyepoxides and polyamines or polyols which solidify to give resinous masses on drying.

For the preparation of epoxy resins, epoxide prepolymers, obtained, for example, by reaction of bisphenol A or other bisphenols, resorcinol, hydroquinone, hexanediol or other aromatic or aliphatic diols or polyols or phenol-formaldehyde condensates or mixtures thereof with one another with epichlorohydrin, dicyclopentadiene diepoxide or other diepoxides or polyepoxides, are usually mixed with further condensable compounds directly or in solution and allowed to cure.

Taking into account the above conditions for the properties of the shell polymers (=matrix polymers), selected components from all groups of organic film formers are in principle suitable for their preparation. Shell polymers which are soluble or at least readily swellable in organic solvents and are therefore advantageously employed as film formers for matrices which bind by drying on are, for example, modified or not excessively high-molecular-weight polyesters, cellulose esters, such as cellulose acetobutyrate, polyurethanes, silicones, or polyether- or polyester-modified silicones.

The preparation of the polymers for the core and the shell is not restricted to a particular process. Instead, all known processes for the preparation of polymers can be employed. Preference is given to the processes of emulsion polymerization, suspension polymerization, microemulsion polymerization or microsuspension polymerization which involve free-radical polymerization. They offer the advantage of not being sensitive to moisture.

Suitable for initiation of the polymerization are polymerization initiators which decompose either thermally or photochemically, form free radicals and thus initiate the polymerization. Of the thermally activatable polymerization initiators, preference is given to those which decompose at from 20 to 180° C., in particular at from 50 to 80° C. Particularly preferred polymerization initiators are peroxides, such as dibenzoyl peroxide, di-tert-butyl peroxide, peresters, percarbonates, perketals, hydroperoxides, but also inorganic peroxides, such as $H_2O_2$, salts of peroxosulfuric acid and azo compounds of peroxodisulfuric acid, alkylboron compounds, and hydrocarbons which decompose homolytically.

The initiators and/or photoinitiators, which, depending on the requirements of the polymerized material, are employed in amounts of from 0.01 to 15% by weight, based on the polymerizable components, can be used individually or, in order to utilize advantageous synergistic effects, in combination with one another.

The stable dispersions which are required for these polymerization-polycondensation or polyaddition processes are generally prepared using dispersion aids.

Processes for the preparation of monodisperse polymer particles have also already been described in the literature (for example R. C. Backus, R. C. Williams, *J. Appl. Physics* 19, p. 1186, (1948)) and can advantageously be employed, in particular, for the preparation of the core polymers. It need merely be ensured here that the above-indicated particle sizes of from 0.05 to 5 μm, preferably from 0.1 to 2 μm, in particular from 0.15 to 1.0 μm and especially from 0.2 to 0.7 μm, and a polydispersity index of less than 0.6, preferably less than 0.4, in particular less than 0.3, result in order to obtain, after orientation of the core particles, a grating which gives rise to Bragg scattering in the visible, near UV or IR region. The aim is the greatest possible uniformity of the polymers.

The crucial factors for the requisite property combination, such as chemical and mechanical resistance and physical data, are their composition and degree of polymerization and/or crosslinking. The resistance of a phase to dissolution or swelling in or by the other phase may, besides by crosslinking of the polymers, also be caused by selecting the monomers for the polymers of core and shell in such a way that "molecularly incompatible" polymers are obtained, i.e. that they—like, for example, oil and water—exhibit no natural tendency to penetrate into one another owing to different $\delta_{-SP}$ values, i.e. different polarity. The solubility parameters $\delta_{-SP}$ characterize the polarity of the relevant compounds and have been published for many low-molecular-weight compounds and polymers (cf. Brantrup-Immergut, "*Polymer Handbook*", 3rd Edition, J.Wiley, New York, Chapter VII). The greater the difference between the $\delta_{-SP}$ values of the core and shell polymers, the lower the tendency toward molecular mixing or swelling.

By setting the reaction conditions, such as temperature, pressure, reaction duration, use of suitable catalyst systems which influence the degree of polymerization in a known manner, and selection of the monomers employed for their preparation in accordance with type and proportion, the desired property combinations of the requisite polymers can be set in a targeted manner.

The light refraction properties of the polymers are also crucially affected by the choice of the monomers employed for their preparation. Monomers which result in polymers having a high refractive index are generally those which have either aromatic moieties or those which contain heteroatoms of high atomic number, for example halogen atoms, in particular bromine or iodine atoms, sulfur or metal ions, i.e. atoms or atom groups which increase the polarizability of the polymers. Polymers of low refractive index are accordingly obtained from monomers or monomer mixtures which only contain the said moieties and/or atoms of high atomic number in small proportions, or not at all.

A review of the refractive indices of various common homopolymers is given, for example, in *Ullmanns Encyklopädie der technischen Chemie*, 5th Edition, Volume A21, page 169. Examples of free-radical-polymerizable monomers which result in polymers of high refractive index are:

Group a): Styrene, styrenes which are substituted by alkyl on the phenyl ring, a-methylstyrene, mono- and dichlorostyrene, vinylnaphthalene, isopropenylnaphthalene, isopropenylbiphenyl, vinylpyridine, isopropenylpyridine, vinylcarbazole, vinylanthracene, N-benzylmethacrylamide and p-hydroxymethacrylanilide.

Group b): Acrylates containing aromatic side chains, for example phenyl (meth)acrylate (=abbreviation for the two compounds phenyl acrylate and phenyl methacrylate), benzyl (meth)acrylate, benzyl vinyl ether, and compounds of the formulae

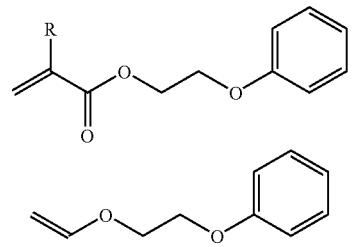

For greater clarity and in order to simplify the notation, hydrocarbon chains in the formulae above and below are only represented by the bonds between the carbon atoms. This notation corresponds to the depiction of aromatic cyclic compounds, with, for example, benzene being represented by a hexagon with alternating single and double bonds.

Suitable compounds are furthermore those which contain sulfur bridges instead of oxygen bridges, for example

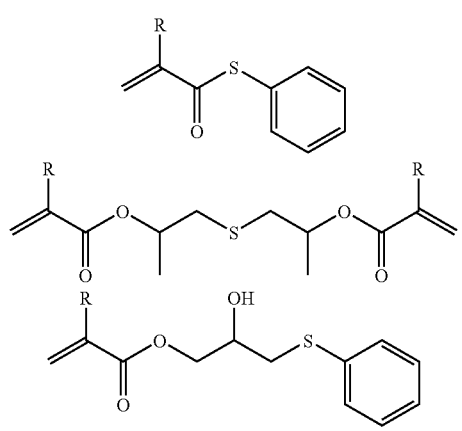

-continued

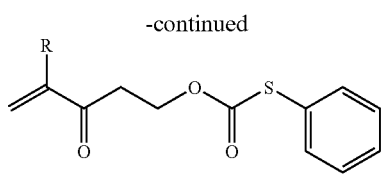

In the above formulae, R is hydrogen or methyl. The phenyl rings in these monomers may carry further substituents. Such substituents are suitable for modifying the properties of the polymers produced from these monomers within certain limits. They can therefore be utilized specifically to optimize, in particular, the applicationally relevant properties of the effect colorants according to the invention.

Suitable substituents are, in particular, CN, halogen, $NO_2$, alkyl having from one to twenty carbon atoms, alkoxy having from one to twenty carbon atoms, carboxyalkyl having from one to twenty carbon atoms, carbonylalkyl having from one to twenty carbon atoms, or —OCOO-alkyl having from one to twenty carbon atoms. The alkyl chains in these radicals may themselves be substituted or interrupted by divalent heteroatoms or groups, for example —O—, —S—, —NH—, —COO—, —OCO— or —OCOO— in non-adjacent positions.

Group c): Monomers which contain heteroatoms, for example vinyl chloride, vinylidene chloride, acrylonitrile, methacrylonitrile, acrylic acid, methacrylic acid, acrylamide and methacrylamide, or organometallic compounds, for example

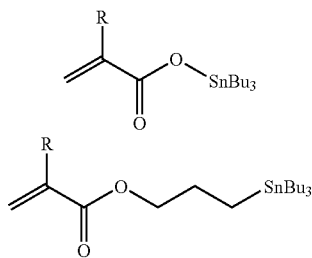

Group d): An increase in the refractive index of polymers is also achieved by copolymerization of monomers containing carboxyl groups and conversion of the resultant "acidic" polymers into the corresponding salts with metals of relatively high atomic weight, for example preferably with K, Ca, Sr, Ba, Zn, Pb, Fe, Ni, Co, Cr, Cu, Mn, Sn or Cd.

The above-mentioned monomers, which make a large contribution to the refractive index of the polymers prepared therefrom, may be homopolymerized or copolymerized with one another. They may also be copolymerized with a certain proportion of monomers which make a smaller contribution to the refractive index. Such copolymerizable monomers having a lower refractive index contribution are, for example, acrylates, methacrylates or vinyl ethers or vinyl esters containing purely aliphatic radicals.

In preferred embodiments of the present invention, at least the core polymers, preferably the polymers of the core and shell, are crosslinked.

The crosslinking can be carried out at the same time as the polymerization or in a separate step after the polymerization (post-crosslinking). A particular form is crosslinking without additives (self-crosslinking). In this case, latently crosslinkable, functional groups are already present in the polymer. It is advantageous, for various applications of the effect colorants according to the invention, to crosslink the core polymers as early as during the polymerization and to crosslink the shell polymers subsequently.

If corresponding complementary groups are present in the polymer, the above-mentioned reactive crosslinking agents which are suitable for the crosslinking of polycondensates, such as compounds containing epoxide, cyanate, isocyanate or isothiocyanate groups, can also be employed for the crosslinking of polymers.

In addition, suitable crosslinking agents for polymers produced by free-radical mechanisms are also all bifunctional or polyfunctional compounds which can be copolymerized with the above-mentioned monomers or which can subsequently react with the polymers with crosslinking.

Examples of suitable crosslinking agents are presented below, divided into groups for systematization:

Group 1: Bisacrylates, bismethacrylates and bisvinyl ethers of aromatic or aliphatic di- or polyhydroxyl compounds, in particular of butanediol (butanediol di(meth)acrylate, butanediol bisvinyl ether), hexanediol (hexanediol di(meth)acrylate, hexanediol bisvinyl ether), pentaerythritol, hydroquinone, bishydroxyphenylmethane, bishydroxyphenyl ether, bishydroxymethylbenzene, bisphenol A or with ethylene oxide spacers, propylene oxide spacers or mixed ethylene oxide/propylene oxide spacers.

Further crosslinking agents in this group are, for example, di- or polyvinyl compounds, such as divinylbenzene, and methylenebisacrylamide, triallyl cyanurate, divinylethyleneurea, trimethylolpropane tri(meth)acrylate, trimethylolpropane trivinyl ether, pentaerythritol tetra (meth)acrylate, pentaerythritol tetravinyl ether, and crosslinking agents having two or more different reactive ends, for example (meth) allyl (meth)acrylates of the formula

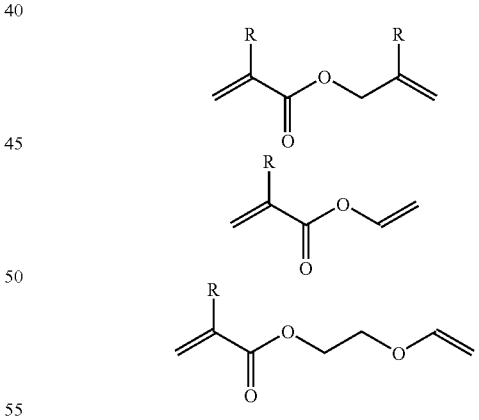

in which R is hydrogen or methyl.

Group 2: Reactive crosslinking agents which have a crosslinking action, but in most cases a post-crosslinking action, for example during heating or drying, and are copolymerized into the core or shell polymers as copolymers.

Examples thereof are: N-methylol(meth)acrylamide, acrylamidoglycolic acid and ethers and/or esters thereof with C1- to C6-alcohols, acetacetoxyethylmethacrylamide (AAEM), diacetoneacrylamide (DAAM), glycidyl methacrylate (GMA), methacryloyloxypropyltrimethoxysilane (MEMO), vinyltrimethoxysilane and m-isopropenylbenzyl isocyanate (TMI).

Group 3: Carboxyl groups which have been incorporated into the polymer by copolymerization of unsaturated carboxylic acids are crosslinked in a bridge-like manner via polyvalent metal ions. The unsaturated carboxylic acids employed for this purpose are preferably acrylic acid, methacrylic acid, maleic anhydride, itaconic acid and fumaric acid. Suitable metal ions are Mg, Ca, Sr, Ba, Zn, Pb, Fe, Ni, Co, Cr, Cu, Mn, Sn and Cd. Particular preference is given to Ca, Mg and Zn.

Group 4: Post-crosslinking additives. These are taken to mean bis- or polyfunctionalized additives which react irreversibly with the polymer (by addition or preferably condensation reactions) with formation of a network. Examples thereof are compounds which contain at least two of the following reactive groups per molecule: epoxide, aziridine, isocyanate, acid chloride, carbodiimide or carbonyl groups, furthermore, for example, 3,4-dihydroxyimidazolinone and derivatives thereof (®Fixapret products from BASF).

As already explained above, post-crosslinking agents containing reactive groups, for example epoxide and isocyanate groups, require complementary reactive groups in the polymer to be crosslinked. Thus, isocyanates react, for example, with alcohols to give urethanes, with amines to give urea derivatives, while epoxides containing these complementary groups react to give hydroxyethers or hydroxyamines.

The term post-crosslinking is also taken to mean photochemical curing, oxidative curing or air- or moisture-induced curing of the systems.

The above-mentioned monomers and crosslinking agents can be combined and (co)polymerized with one another as desired and in a purposeful manner to give an optionally crosslinked (co)polymer having the desired refractive index and the requisite stability criteria and mechanical properties.

It is also possible additionally to copolymerize common monomers, for example acrylates, methacrylates, vinyl esters, butadiene, ethylene or styrene, in order, for example, to set a glass transition temperature or the mechanical properties of the core and shell polymers as needed.

Core/shell particles which can be formed into a film, their production and their film formation to give dispersion films which are very particularly advantageously suitable for the laser amplifying media according to the invention are described in detail in European patent application EP-A 0 955 323 by the applicant of the present application. The disclosure content of this application is expressly incorporated herein by way of reference.

The particularly preferred polymer dispersions according to the invention consist of an elastomer having a crystal structure which causes Bragg scattering. The desired crystal lattice separations can be controlled by specific adjustment of the particle size of the emulsion polymers. The crystals are produced by simple film formation of the dispersions on a desired transparent substrate. During film formation, the primary particles crystallize, and the desired optical properties are fixed. Dyes are doped into the polymer dispersion while the latter is still liquid. The emitted light of the dye ($\lambda_f$) then experiences only internal reflection in the polymer dispersion crystal matrix (lattice spacing d) if the emission wavelength $\lambda$ of the dye in the matrix satisfies the Bragg condition $$2 d \sin \theta = m^* \lambda$$

(m=1,2,3, ... ). For the preferred case of light propagation perpendicular to the film surface, i.e. also perpendicular to the lattice planes, sin θ=1. The emission wavelength of the dye laser is thus fixed. The emission wavelength $\lambda_f$ of the dye laser can be adjusted by varying the particle-particle separation in the polymer dispersion crystal. The particle-particle separation in the polymer dispersion crystal can be varied by thermal, mechanical or electronic influences, which enable a specific change in the laser emission. Thus, mechanical stretching in the lattice plane, for example, enables a reduction to be achieved in the lattice separation perpendicular thereto and thus a shorter laser wavelength.

According to an embodiment of the invention, the amplifying medium comprises at least three layers, with the active medium containing the particles which can be excited to emit laser light forming the central layer, which is arranged between adjacent dispersion films which serve as optical feedback means. Consequently, laser light generated in the interlayer is able to propagate freely therein and is then reflected back at the adjacent dispersion films. In the case of diode lasers, a similar arrangement can be produced by means of suitably modulated semiconductor structures, and the term distributed Bragg reflectors (DBR) is used therein. The interlayer may be, for example, a polymer film which is doped with a suitable laser dye or another suitable active medium. It should be possible to coat an interlayer of this type in a simple manner with the dispersion films acting as Bragg reflectors. The reflection properties of the dispersion films also depend on the layer thickness of the films. In the present embodiment, a layer can be designed in such a way that virtually 100% reflection is achieved, while the other layer can have a lower degree of reflection, thus ensuring directed emission of the laser beam.

According to another embodiment of the invention, the active medium containing the excitable particles can also comprise the feedback medium. In this case, the active medium may be in the form of a polymeric dispersion film which is doped with suitable laser dyes.

According to another variant, the active particles, i.e., for example, the laser dye, can be covalently bonded to constituents of the polymeric dispersion film. It is also possible to use a polymeric material which stimulates light emission instead of conventional laser dyes. Properties of this type have been described, for example, for conjugated polymers, such as poly(p-phenyl vinyl ether) (Kallinger et al., *Adv Mater*, 1998, 10, pages 920 ff).

Owing to the wide variety of commercially available compounds, however, the classical laser dyes are the preferred excitable particles of the present invention. Suitable laser dyes are described, for example, in *Ullmanns Encyclopedia of Industrial Chemistry*, 5th Edition, Vol. A15, pages 151 ff. Suitable dyes include, for example, polyphenyl and heteroaromatic compounds, stilbene, cumarine, xanthene or methine dyes.

Polymeric dispersion films are particularly preferably produced using substantially monodisperse particles as feedback medium of solid-state dye lasers, since systems of this type are able to form films to give highly ordered structures. The production of suitable monodisperse core/shell particles is likewise described in EP-A 0 955 323.

The present invention also relates to a solid-state dye laser which contains the above-described amplifying medium and which has pump means designed to excite the particles of the active medium. The excitation is particularly preferably carried out using optical pump sources, in particular pump lasers. In principle, any pump source which emits electromagnetic radiation having a higher frequency than the frequency of the laser emission is suitable. Preferred pump lasers include continuous lasers, for example argon or krypton lasers, pulsed lasers, for example nitrogen, excimer or frequency-multiplied Nd:YAG lasers.

The present invention is explained in greater detail below with reference to the attached drawings, in which.

Figure 1:
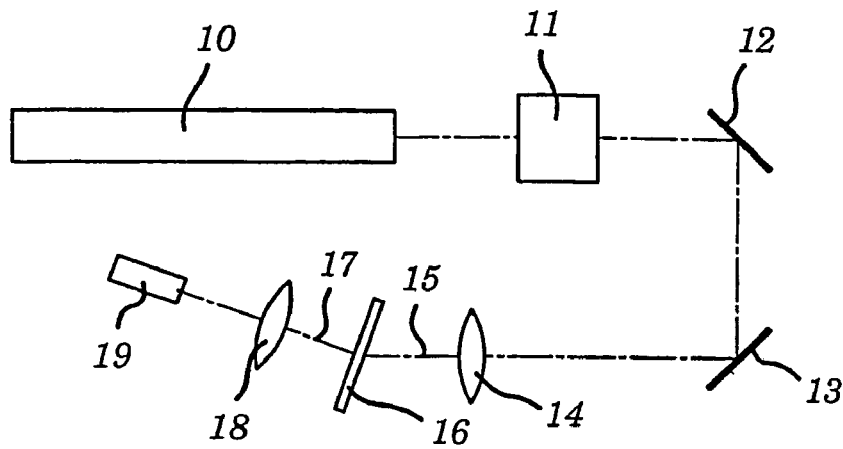
FIG. 1 shows a diagrammatic representation of a preferred embodiment of a solid-state dye laser system according to the invention.

FIG. 1 shows a preferred embodiment of the solid-state dye laser according to the invention. The solid-state dye laser comprises pump means, for example a frequency-doubled Nd:YAG laser 10, and suitable means 11 for controlling the pulse energy of the pump laser 10, for example polarizers, λ/2 plates, etc. Optical means, such as mirrors 12, 13 and a lens arrangement 14, are used to focus the pump laser beam 15 on the amplifying medium 16 according to the invention. A lens 17 collects the emitted laser light and directs it into an optical fiber 18. In the example shown, the pump laser beam is incident essentially perpendicular to the layer surface of the amplifying medium 16. Slight tilting of the amplifying medium 16, here in the form of a film, may, however, be advantageous in order to separate the excitation beam and the laser beam produced in the amplifying medium spatially from one another. Since the periodicity is essentially equal parallel and perpendicular to the layer plane (cf. FIG. 7), laser emission in the example shown can take place both perpendicular and parallel to the layer. The dye-doped amplifying medium typically has a thickness of from 5 to 100 μm, and the dye concentration is typically from $10^{-4}$ to $10^{-2}$ mol.

Figure 2:
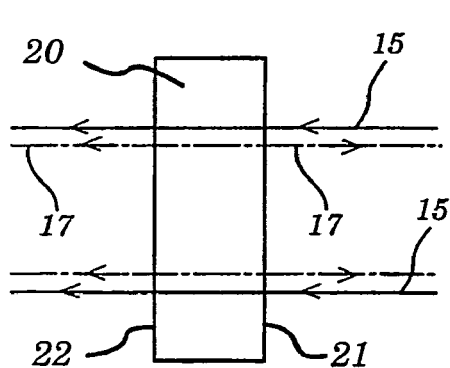
FIG. 2 shows a diagrammatic representation of a first embodiment of the amplifying medium according to the invention.

FIG. 2 shows a cross section of the first embodiment of the amplifying medium 16 according to the invention. The amplifying medium consists of a single dye-doped dispersion film 20. The amplifying medium is excited by longitudinal optical pumping by means of a pump laser (not shown in FIG. 2). The pumped-laser beam 15 and the dye-laser beam 17 propagate in a co-linear manner in the amplifying medium 20, as indicated in FIG. 2 by the arrows. Without further measures, the dye-laser beam is emitted from both surfaces 21, 22 of the dispersion film 20.

Figure 3:
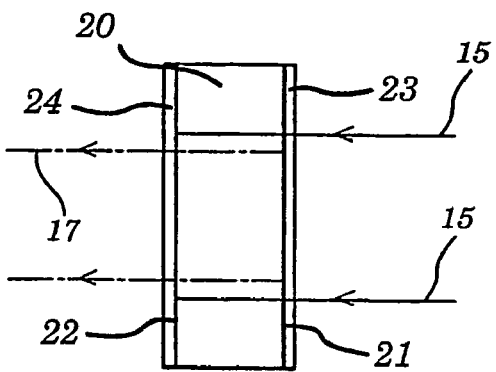
FIG. 3 shows a variant of the amplifying medium of FIG. 2.

FIG. 3 shows a variant of the amplifying medium of FIG. 2. The surface 21 of the amplifying medium is provided with a highly reflective dichroic coating 23, which reflects essentially completely at the wavelength of the dilaser, but is transparent to light at the wavelength of the pump laser. The surface 22 of the amplifying medium 20 is likewise provided with a highly reflective dichroic coating 24 which reflects essentially completely at the wavelength of the pump laser, but is transparent to light at the wavelength of the dye laser. The special arrangement of the embodiment in FIG. 3 ensures directed emission of the dye-laser beam, which is only able to leave the amplifying medium via surface 22.

Figure 4:
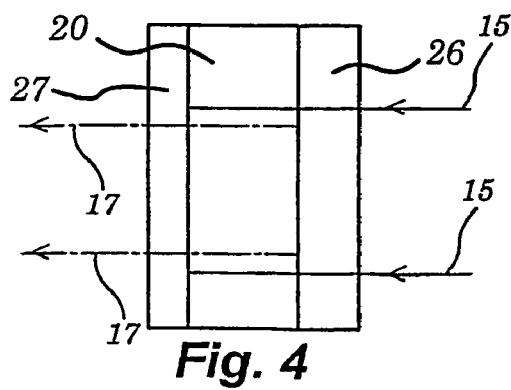
FIG. 4 shows a diagrammatic representation of a second embodiment of the amplifying medium according to the invention.
Figure 5:
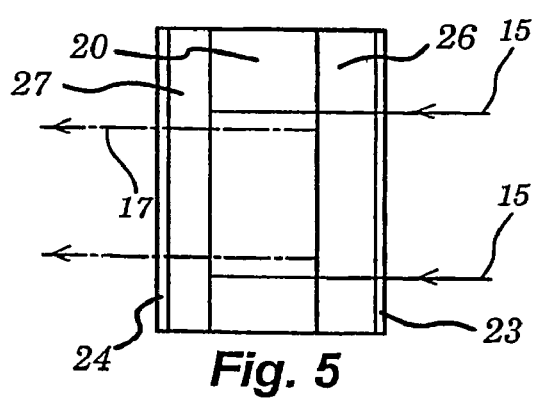
FIG. 5 shows a variant of the amplifying medium of FIG. 4.

The embodiments in FIGS. 4 and 5 essentially correspond to those in FIGS. 2 and 3 respectively, but with the difference that the amplifying medium 20 consists of three layers: the active medium is formed by an interlayer 25 which contains the laser dye, but does not itself have distributed feedback. Layer is arranged between two dispersion films 26, 27, which act as distributed reflectors for the laser light emitted in the active medium 25. The degree of reflection by layer 27 is, however, so much reduced compared with the degree of reflection by layer 26, ensuring directed emission of the laser beam 17.

Directed emission of the laser beam can also be improved if, as shown in FIG. 5, additional reflective coatings 23, 24 are provided. The reflective coatings 23 and 24 here may correspond to the reflective coatings 23, 24 in the embodiment in FIG. 3.

Figure 6:
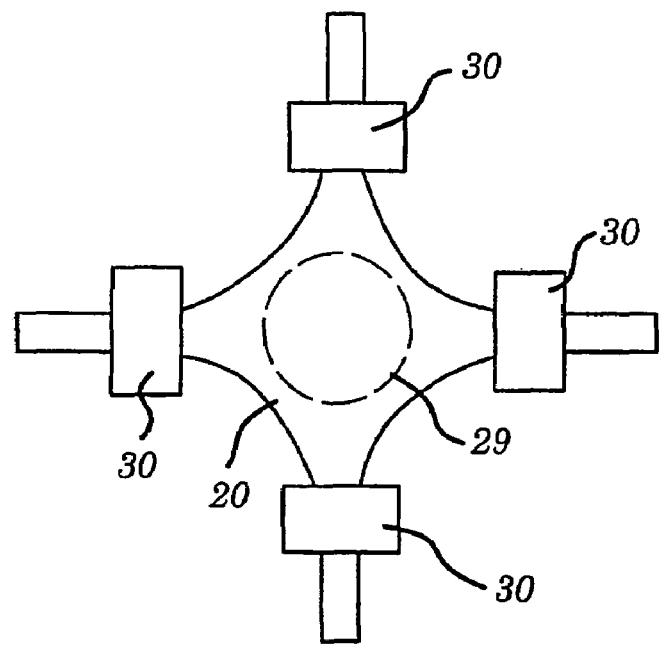
FIG. 6 shows an elastomeric amplifying medium clamped in a stretching device in order to tune the laser emission wavelength.

FIG. 6 shows a plan view of the amplifying medium 20, which, in the example shown, is in the form of an elastomeric dispersion film. The amplifying medium is fixed in the clamps 30 of a stretching device. By exerting biaxial tensile forces, the lattice separation d (cf. FIG. 7) can be reduced in a central region 29 perpendicular to the film plane shown, which, in the case of a pumped beam incident perpendicularly to the film plane, results in a shortening of the wavelength of the laser light likewise emitted perpendicularly to the film plane. A mechanically tunable solid-state dye laser can thus be implemented in a simple manner. At the same time, the lattice separations in the film plane are also changed, so that laser light can only be emitted essentially perpendicular to the surface of the dispersion film.

Figure 7:
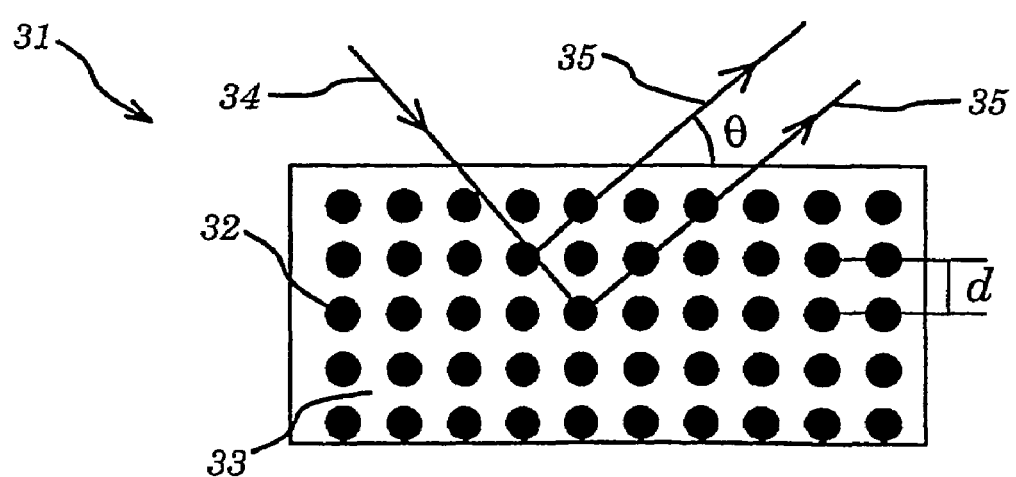
FIG. 7 shows a diagrammatic representation of the structure of the polymeric dispersion film employed in the amplifying medium according to the invention.

FIG. 7 shows the basic structure of the dispersion film 31 of the amplifying medium according to the invention. The dispersion film 31 consists of core/shell particles, with the shell material being capable of forming a film, as described in EP-A 0 955 323. A regular lattice comprising cores 32 arranged in the filmed matrix 33 consisting of shell material, is formed. An incident light beam 34 is diffracted at the lattice planes arranged at a separation d in such a way that, at an angle θ, only light having a wavelength defined in accordance with the Bragg equation is able to undergo constructive interference, i.e. reflection.

The amplifying medium according to the invention can be mounted in an adjustment device as described in U.S. Pat. No. 6,141,367 for amplifying media comprising polymeric cholesteric liquid crystals. An adjustment device of this type enables movement of the amplifying medium relative to the pump source. The amplifying medium according to the invention may likewise be constructed of strips of different laser wavelength, enabling the laser also to be tuned by a pure translation movement of the amplifying medium relative to the pump beam.

USE EXAMPLE

The polymer dispersion was prepared as described in patent EP-A 0 955 323 and formed into a film as described therein to give an elastic layer. In order to produce laser radiation, the fluorescent dye DCM (4-dicyanomethylene)-2-methyl-6-(4-dimethylaminostyryl)-4H-pyran) was firstly added to the liquid polymer dispersion. The dye concentration was selected in structure a way that, after drying of the dispersion film, 0.2% by weight of DCM were still present in the polymer dispersion. The doped suspension was applied to a polyester film using a 200 μm doctor blade and dried at room temperature. The lattice separation d of the colloidal crystal formed in this way was about 330 mm.

The polymer dispersion film doped with the fluorescent dye was employed as amplifying medium in a dye laser as shown in FIG. 1. The pump laser beam used was a frequency-doubled Nd:YAG laser having a pulse duration of 35 ps at a wavelength of 532 nm. The pulse energy was adjusted with the aid of a polarizer and a $\lambda/2$ plate. The pumped-laser beam was focused on the substrate using a lens having a focal length f=20 cm and a diameter of 2.5 cm. The beam diameter on the dispersion film was 300 μm. The emitted laser light was collected and focused on a spectrometer. The emission was recorded by means of a CCD detector in continuous mode. Above the laser threshold, laser emission in the range from 620 to 570 nm was observed, depending on the stretching of the dispersion film.

We claim:

1. An amplifying medium for solid-state dye lasers, comprising:
   an essentially solid active medium which comprises at least one type of activatable particle which can be excited to emit laser light in a certain wavelength range,
   optical feedback means which define a resonator for the laser light, where the feedback means comprise an essentially solid feedback medium which has a periodic structure, said feedback medium being made from a polymeric dispersion film having a crystalline structure,
   wherein
   said polymeric dispersion film comprises core/shell particles which can be formed into a film, said core/shell particles having a core material and a shell material which are able to form a two-phase system, where the shell material can be formed into a film, and the core material is essentially dimensionally stable under the conditions of film formation of the shell.

2. An amplifying medium as claimed in claim 1, wherein the core material has a monodisperse size distribution in the range from 100 to 700 nm.

3. An amplifying medium as claimed in claim 2, wherein the core material has a polydispersity index P.I. of less than 0.4.

4. An amplifying medium as claimed in claim 1, wherein the difference $\Delta n$ between the refractive indices of the core material and of the shell material is at least 0.001.

5. An amplifying medium as claimed in claim 1, wherein the core:shell weight ratio of the particles is from 1:3 to 20:1.

6. An amplifying medium as claimed in claim 1, wherein the dispersion film is an elastomeric dispersion film.

7. An amplifying medium as claimed in claim 1, wherein the active medium is arranged between two dispersion films.

8. An amplifying medium as claimed in claim 1, wherein the active medium and the feedback medium are a single medium which is formed by at least one dispersion film containing the activatable particles.

9. An amplifying medium as claimed in claim 8, wherein the activatable particles are dissolved in the dispersion film.

10. A solid-state dye laser which comprises an amplifying medium as claimed in claim 1 and pump means designed to excite the activatable particles of the amplifying medium.

* * * * *